United States Patent
Ruhl et al.

(10) Patent No.: US 12,507,866 B2
(45) Date of Patent: Dec. 30, 2025

(54) FENESTRATED SUCTION RETRACTOR

(71) Applicant: THE GOVERNMENT OF THE UNITED STATES AS REPRESENTED BY THE SECRETARY OF THE ARMY, Fort Detrick, MD (US)

(72) Inventors: Douglas Scott Ruhl, DuPont, WA (US); Renee Makowski Serra, Tacoma, WA (US)

(73) Assignee: THE GOVERNMENT OF THE UNITED STATES AS REPRESENTED BY THE SECRETARY OF THE ARMY, Fort Detrick, MD (US)

( * ) Notice: Subject to any disclaimer, the term of this patent is extended or adjusted under 35 U.S.C. 154(b) by 265 days.

(21) Appl. No.: 18/139,130

(22) Filed: Apr. 25, 2023

(65) Prior Publication Data
US 2023/0337896 A1 Oct. 26, 2023

Related U.S. Application Data

(60) Provisional application No. 63/334,403, filed on Apr. 25, 2022.

(51) Int. Cl.
*A61B 1/00* (2006.01)
*A61B 1/015* (2006.01)
*A61B 1/267* (2006.01)
*A61B 17/02* (2006.01)

(52) U.S. Cl.
CPC .......... *A61B 1/00094* (2013.01); *A61B 1/015* (2013.01); *A61B 1/267* (2013.01); *A61B 17/02* (2013.01); *A61B 2217/005* (2013.01); *A61B 2218/008* (2013.01)

(58) Field of Classification Search
CPC ..... A61B 17/02; A61B 1/267; A61B 1/00094; A61B 1/015; A61B 2217/005
USPC ................. 600/187, 205, 237, 240
See application file for complete search history.

(56) References Cited

U.S. PATENT DOCUMENTS

| 3,154,069 | A |   | 10/1964 | Ring |   |
|---|---|---|---|---|---|
| 3,768,477 | A | * | 10/1973 | Anders | A61C 17/08 433/91 |
| 4,017,975 | A |   | 4/1977 | Johnson |   |
| 5,460,626 | A |   | 10/1995 | Krespi |   |
| 6,248,061 | B1 | * | 6/2001 | Cook, Jr. | A61B 1/267 600/187 |
| 7,182,728 | B2 | * | 2/2007 | Cubb | A61B 1/267 600/187 |

(Continued)

FOREIGN PATENT DOCUMENTS

KR 20170072744 A 6/2017

*Primary Examiner* — Eduardo C Robert
*Assistant Examiner* — Christina Negrellirodriguez
(74) *Attorney, Agent, or Firm* — Timothy H. Van Dyke; Wolter Van Dyke Davis, Pllc

(57) ABSTRACT

A tongue blade (retractor) with fenestrated suction ports along the length of the blade to remove (suction) smoke, fluid and/or particulate from the oral cavity during surgery (e.g. tonsillectomy, adenoidectomy, oral cavity/tongue/airway procedures). This blade can connect to routine mouth retractors and commonly available suction tubing. It has a groove along the length of the blade to accommodate endotracheal tubes for stabilization and to minimize pressure against the tongue during retraction.

14 Claims, 20 Drawing Sheets

(56) References Cited

U.S. PATENT DOCUMENTS

| | | |
|---|---|---|
| 8,852,169 B2 | 10/2014 | Milo |
| 9,283,308 B2 | 3/2016 | Hajarian et al. |
| 9,788,924 B2 | 10/2017 | Nguyen et al. |
| 2008/0166684 A1 | 7/2008 | Kanas |
| 2014/0364695 A1* | 12/2014 | Nadershahi ...... A61B 17/12136 600/219 |
| 2015/0101598 A1* | 4/2015 | Wang ................ A61M 16/0459 128/202.16 |
| 2019/0083074 A1 | 3/2019 | Reyes et al. |
| 2020/0155284 A1 | 5/2020 | Baker |

* cited by examiner

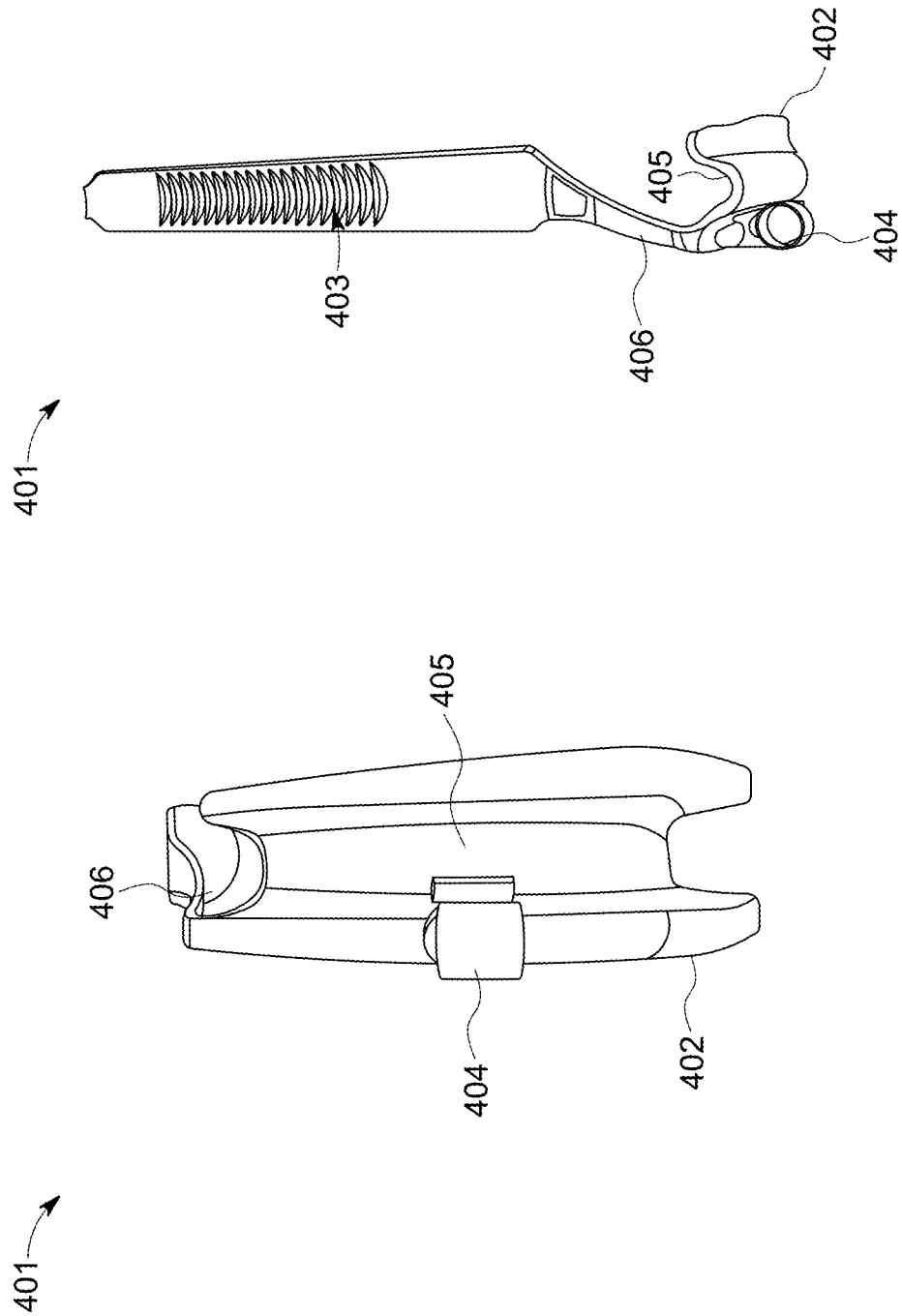

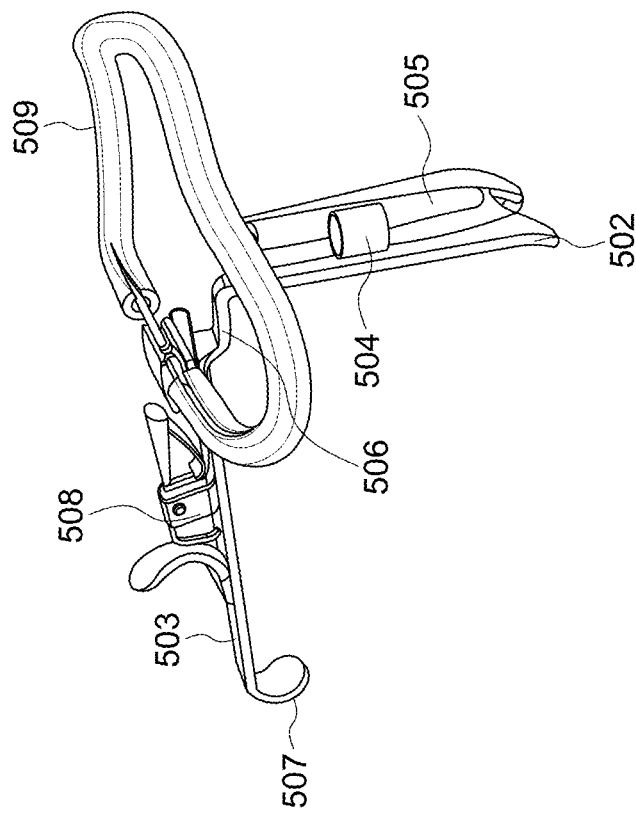
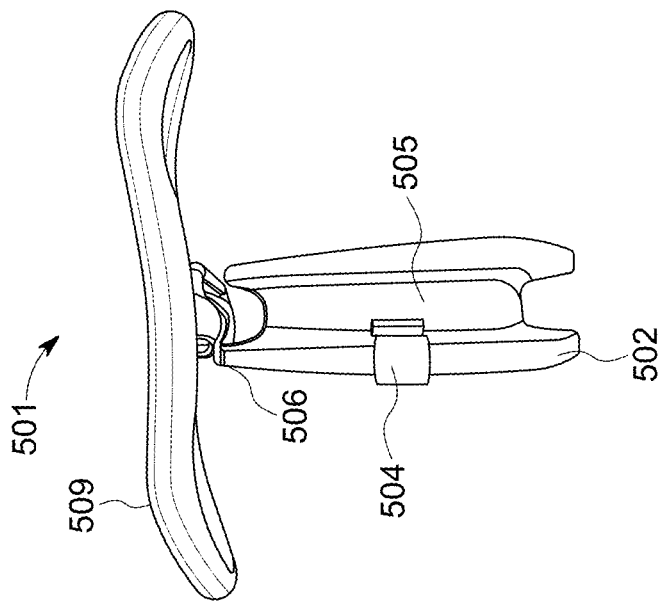
FIG. 6B
FIG. 6A

FENESTRATED SUCTION RETRACTOR

BACKGROUND

Surgeons and Dentists that work in the head and neck region are especially vulnerable to aerosolizing high viral loads during procedures performed in the upper aerodigestive tract. For example, one of the most common surgeries in the United States is tonsillectomies—this surgery creates abundant smoke plume that is contained in the oral cavity and leaves via the mouth. Healthcare workers must be mindful of surgical smoke plumes, especially with increased concern for viral particulates. Smoke plume can carry small viral particles and contaminate the room and infect clinicians. Currently, controlling smoke plume and aerosol particles is dependent on a suction wand held by the assistant at the edge of the oral cavity or a flat tongue blade with a single distal suction port. Current products on the market only have a single suction port near on the distal end of the retractor, are not grooved to accommodate an endotracheal tube and the port for suction is acutely angled that may not provide adequate access to connect to suction tubing.

BRIEF DESCRIPTION OF THE DRAWINGS

The present embodiments are illustrated by way of example, and not by way of limitation, in the figures of the accompanying drawings.

The following figures are illustrative only, and are not intended to be limiting.

FIG. 5A show a front view of an embodiment of a tongue retractor with an attachment component for a suction tube.

FIG. 5B shows a top view of the embodiment shown in FIG. 5A.

FIG. 6A shows a front view of a retractor embodiment including an oral mouthpiece (McIvor Mouthpiece).

FIG. 6B shows a side perspective view of the embodiment shown in FIG. 6A

DEFINITIONS

Figure 1B:
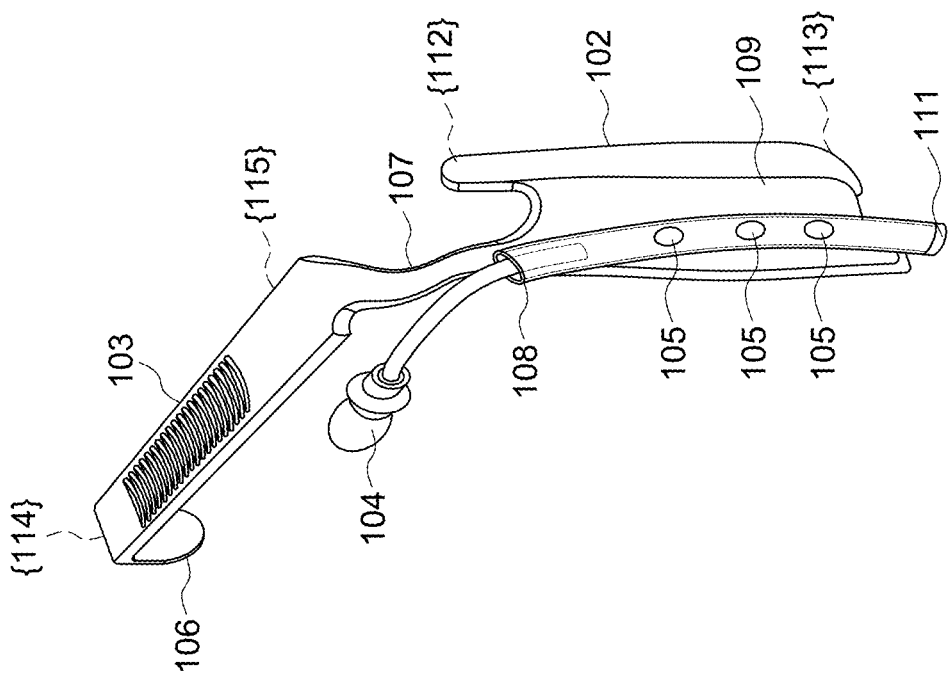
FIG. 1B shows a front perspective view of the embodiment shown in FIG. 1A.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated container and method, and such further applications of the principles of the invention as illustrated therein being contemplated as would normally occur to those skilled in the art to which the invention pertains.

It is to be noted that the terms "first," "second," and the like as used herein do not denote any order, quantity, or importance, but rather are used to distinguish one element from another, unless otherwise specifically stated herein. The terms "a" and "an" do not denote a limitation of quantity, but rather denote the presence of at least one of the referenced item. The modifier "about" used in connection with a quantity is inclusive of the stated value and has the meaning dictated by the context. The term "about" generally refers to a range of numbers that one of skill in the art would consider equivalent to the recited value (i.e., having the same function or result). About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about. In a specific embodiment, the term "about" includes a stated numerical value as well as a value that is +/−30% of the stated numerical value. For example, about 40 degrees includes 40 degrees as well as angles of 36 degrees and 44 degrees, and all values in between. In many instances, the term "about" may include numbers that are rounded to the nearest significant figure. Furthermore, to the extent that the terms "including," "includes," "having," "has," "with," or variants thereof are used in either the detailed description and/or the claims, such terms are intended to be inclusive in a manner similar to the term "comprising."

It is to be noted that all ranges disclosed within this specification are inclusive and are independently combinable. Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, the terms "subject", "user" and "patient" are used interchangeably. As used herein, the term "subject" refers to an animal, preferably a mammal such as a non-primate (e.g., cows, pigs, horses, cats, dogs, rats etc.) and a primate (e.g., monkey and human), and most preferably a human.

As used herein, the term "tongue blade" refers to a retractor that is placed along the tongue and used to open the mouth and suspend the patient into a position that allows direct visualization of the oral cavity, pharynx (oropharynx, nasopharynx, hypopharynx) or glottis for visualization, procedures and/or surgery.

As used herein, the term "mouthpiece" refers to an oral retractor or a device that rests on the mouth, teeth, and/or lips that help open the mouth to suspend a patient into a position that facilitates visualization, procedures or surgery. Tongue blades often attach to mouthpieces. Mouthpieces stabilize tongue blades. Examples of these include Crowe-Davis, McIvor, Dingman, etc.

As used herein, the term "laryngeal blade" refers to handheld devices that help retract a tongue and suspend a patient into a position that facilitates visualization of the pharynx or glottis for visualization and procedures (most commonly intubation).

DETAILED DESCRIPTION

Disclosed is a novel surgical device that acts as a tongue blade (retractor) with fenestrated suction ports along the length of the blade to remove (suction) smoke, fluid and/or particulate from the oral cavity during surgery (e.g. tonsillectomy, adenoidectomy, oral cavity/tongue/airway procedures). This blade can attach to routine mouth retractors and commonly available suction tubing. It has a groove along the length of the blade to accommodate endotracheal tubes for stabilization and to minimize pressure against the tongue during retraction.

Currently, controlling smoke plume and aerosol particles is dependent on a suction wand held by the assistant at the edge of the oral cavity or a flat tongue blade with a single distal suction port. The disclosed surgical device is advantageous since it:
  i. Allows hands-free use. The Surgeon can operate with both hands as the suction actively works along the entire oral cavity. The surgical scrub tech or assistant is thus not required to hold a suction, which may obstruct the surgical view, and can actively assist with surgical needs.
  ii. The fenestrations (suction ports) are along the vertical length of the blade/retractor. This allows active removal of fluid and particles throughout the oral cavity.
  iii. The blade/retractor has a groove (channel) to accommodate an endotracheal tube. This minimizes pressure against the tongue during retraction and holds the tube in a more secure midline position.
  iv. The suction attachment is angled to extend out of the oral cavity and be easily accessible for connection to suction tubing.

The surgical device disclosed could be used for any surgery where smoke plume or aerosolization is a concern. This is of particular benefit to Otolaryngologists (ENT surgeons) who work in the head and neck region. For example, one of the most common surgeries in the United States is tonsillectomies—this surgery creates abundant smoke plume that is contained in the oral cavity and leaves via the mouth. Fenestrations (also referred to herein as apertures) along the height of the tongue retractor could be used to ensure higher safety in this setting by surrounding the operative field. This improves the efficacy of smoke/particulate capture close to the oral/nasopharyngeal source and could increase safety and minimize the negative impact of spreading respiratory disease (e.g. during a pandemic/endemic or when treating infected patients in general).

The novel features of the disclosed surgical device include a tongue blade (retractor) that is grooved to support the endotracheal tube and includes a fenestrated portion along the height of the tongue blade. In certain embodiments, this could be on either (or both) sides of the groove. The attachment for typical and standard suction tubing available in the operating room is angled to ensure it is accessible outside of the oral cavity. This will be a single item specifically created for this purpose. This will have a similar handle to existing tongue blades to allow its use on a variety of oral/mouth retractors commonly used in the operating room. The blade will have a vertical groove to accommodate and stabilize the endotracheal tube to minimize pressure against the tongue during retraction.

In certain embodiments, the tongue blade includes a hollow channel(s) designed to guide a flexible suction tube into the surgical field to evacuate material. The tubing is held outside the surgeon's view by the O-Ring sleeve which can vary in size and number. The channel accommodates flexible, fenestrated suction tubing that is passed once the tongue blade and retractor are assembled and positioned in the oral cavity. Surgeons may find this ideal since an orogastric tube could be placed through the O-Ring for suction. Orogastric tubes are often used at the conclusion of airway cases to suction the pharynx and stomach contents to mitigate aspiration in the postoperative setting. Also, a custom created flexible suction could be fabricated with an ideal number of fenestrations for this device. The latter may be ideal since the fenestrations could be placed in a position to maximize particulate evacuation.

According to another embodiment, disclosed is a method for hands free evacuation from the surgical site during surgery. The method includes obtaining a surgical device embodiment described herein; connecting the surgical device to a pneumatic evacuation device; positioning the surgical device near a surgical site; and activating the pneumatic evacuation device when evacuation is required.

Description of Illustrated Embodiments

Figure 1A:
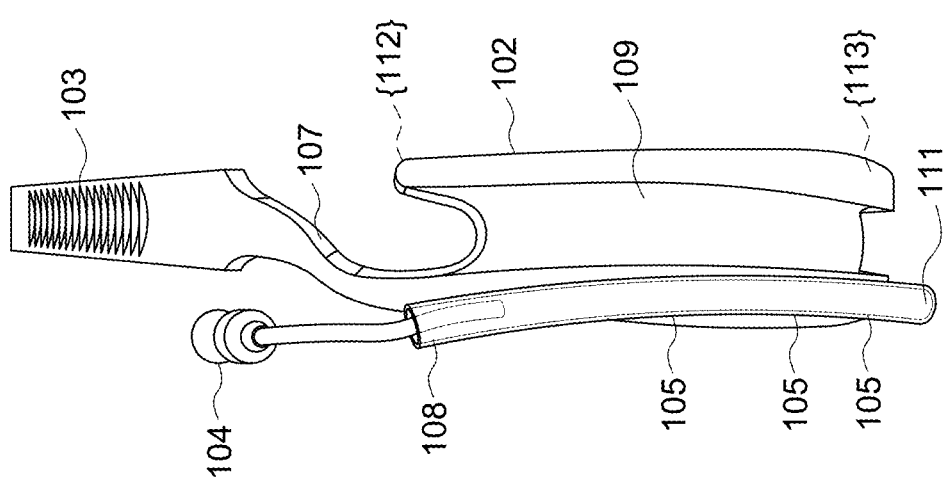
FIG. 1A shows a front view of an embodiment of a retractor embodiment.
Figure 1C:
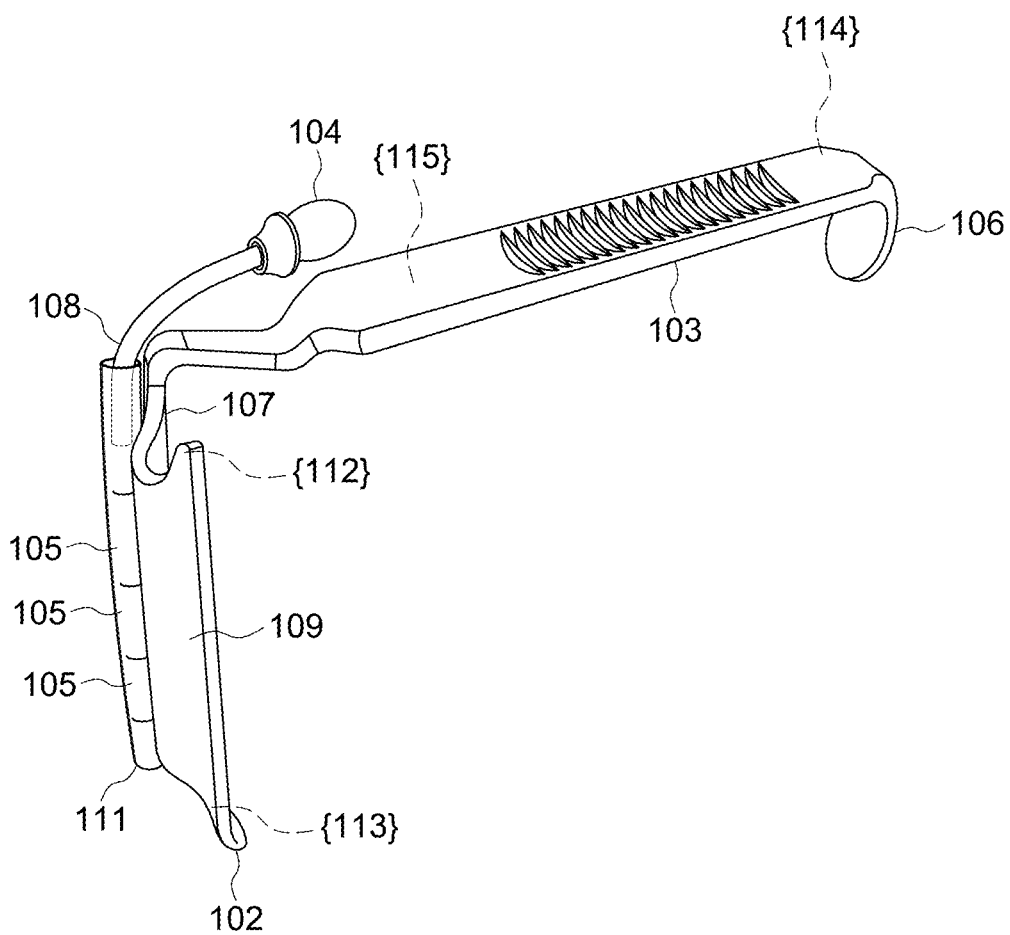
FIG. 1C shows a side perspective view of the embodiment shown in FIG. 1A.

Turning to the drawings, FIG. 1A-C are illustrations of an embodiment 101 of the surgical device including a tongue blade 102 for inserting into a patient's mouth during a surgery to a handle 103 for holding the surgical device and stabilizing the placement of the surgical device in a patient's mouth during a surgery. The handle 103 having a proximal end 114 and a distal end 115 with a curved tip 106 located at the proximal end 114 of the handle 103. The tongue blade 102 further having a proximal end 112 and a distal end 113, with a conduit 111 beginning at the proximal end 112 and extending to the distal end 113. The tongue blade 102 and handle 103 are linked by a neck 107 extending from the distal end 115 and proximal end 112. The tongue blade 102 has a length of about 60 mm to about 110 mm and a width of about 20 mm to about 40 mm depending on the size needed for the patient. The conduit 111 having a row of apertures 105 beginning at the proximal end 112 and extending to the distal end 113. In certain embodiments, there are 3 to 4 perforations along the conduit 111. The conduit 111 and row of apertures 105 are pneumatically connected 108 to a receiving port 104 located at the proximal end 112. The receiving port 104 connects to an external pneumatic evacuation device. In certain embodiments, the tongue blade 102 has a channel 109 beginning at the proximal end 112 and extending to the distal end 113, and the channel 109 is on a side neighboring to the row of apertures 105. The channel 109 provides a generally concaved space on the rearward face (side of blade 102 facing toward the handle 103) that allows for placement and stabilization of airway equipment.

Figure 2A:
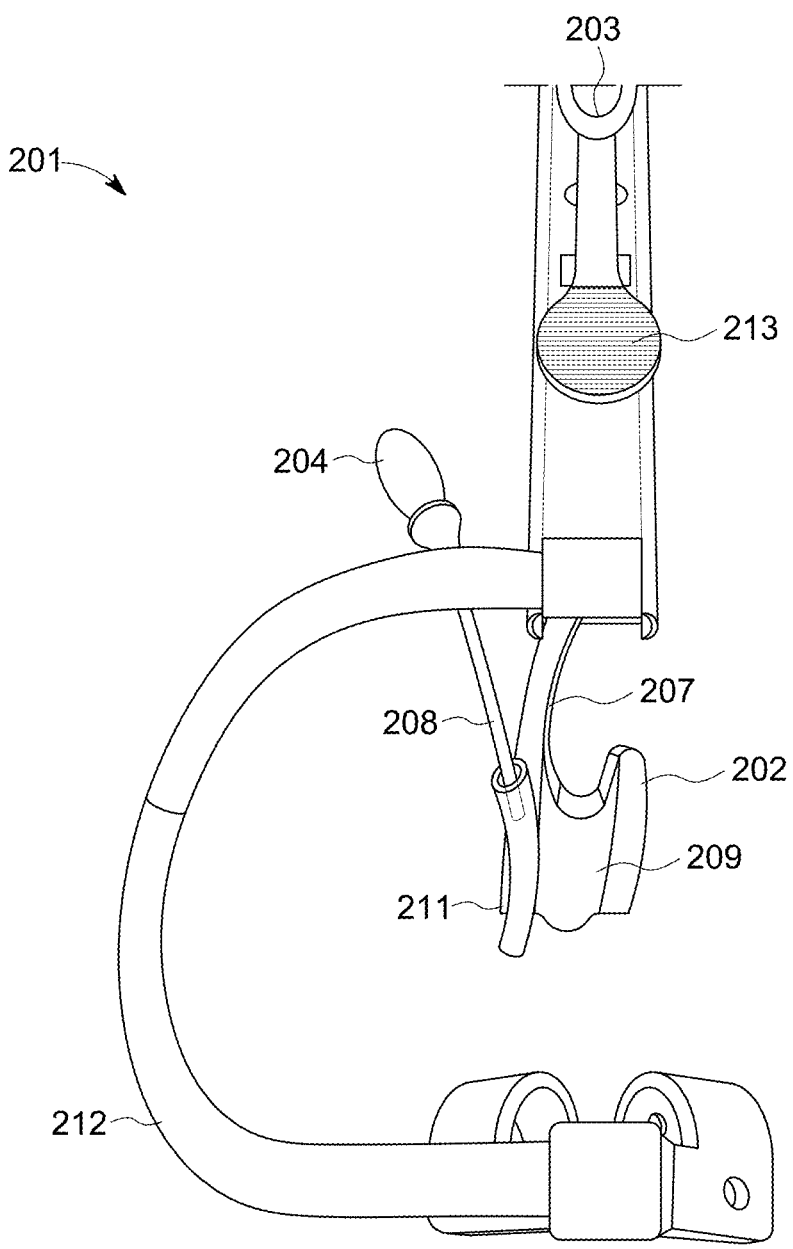
FIG. 2A shows an embodiment of a surgical retractor embodiment inserted into an oral frame (Crowe-Davis Mouthpiece example).
Figure 2B:
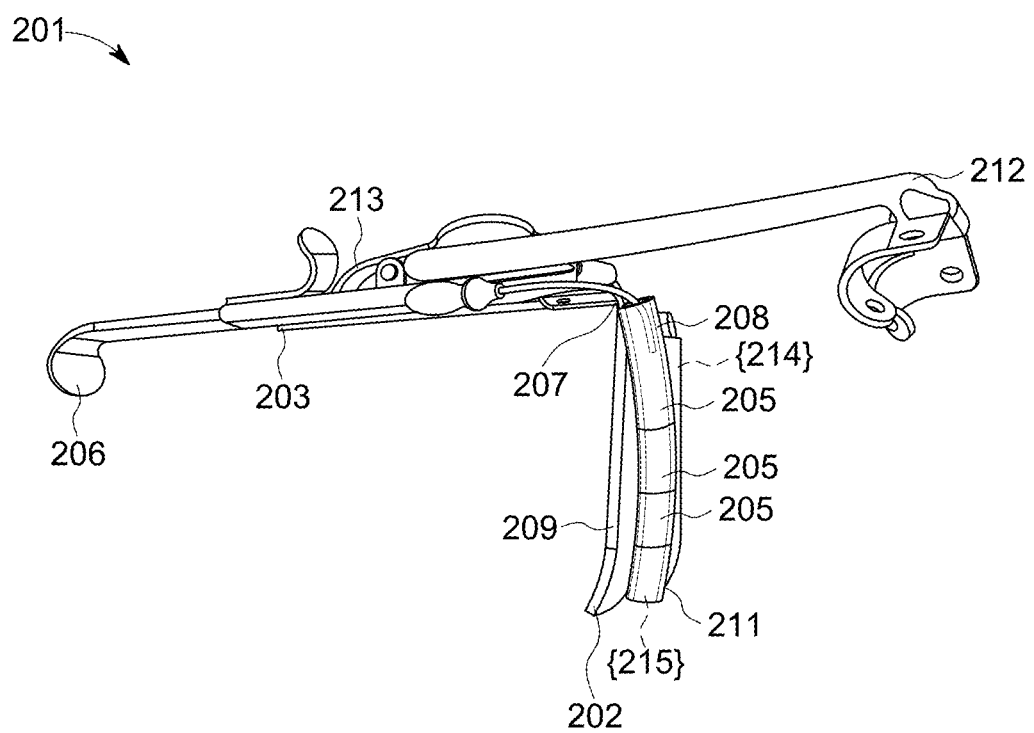
FIG. 2B shows a side perspective view of the embodiment shown in FIG. 2A.

FIG. 2A-B are illustrations of an embodiment 201 of the surgical device including an attachment component 213 for an oral frame 212. This embodiment 201 differs from embodiment 101 in that includes attachment component 213 for an oral frame 212 is located on the handle 203. The handle 203 and the tongue blade 202 are linked by a neck 207. There is a tongue blade 202 containing a proximal end 214 and a distal end 215, with a conduit 211 beginning at the proximal end 214 and extending to the distal end 215. The tongue blade 202 also has a channel 209 (similar to 109) to accommodate placement and stabilization of airway equipment. The conduit 211 having a row of apertures 205 beginning at the proximal end 214 and extending to the distal end 215. The conduit 211 and row of apertures 205 are pneumatically connected 208 to a receiving port 204 located at the proximal end 214. This conduit 211 is positioned below the oral mouthpiece 212 to avoid impeding the tongue blade's attachment component 213 to the mouthpiece handle.

Figure 3:
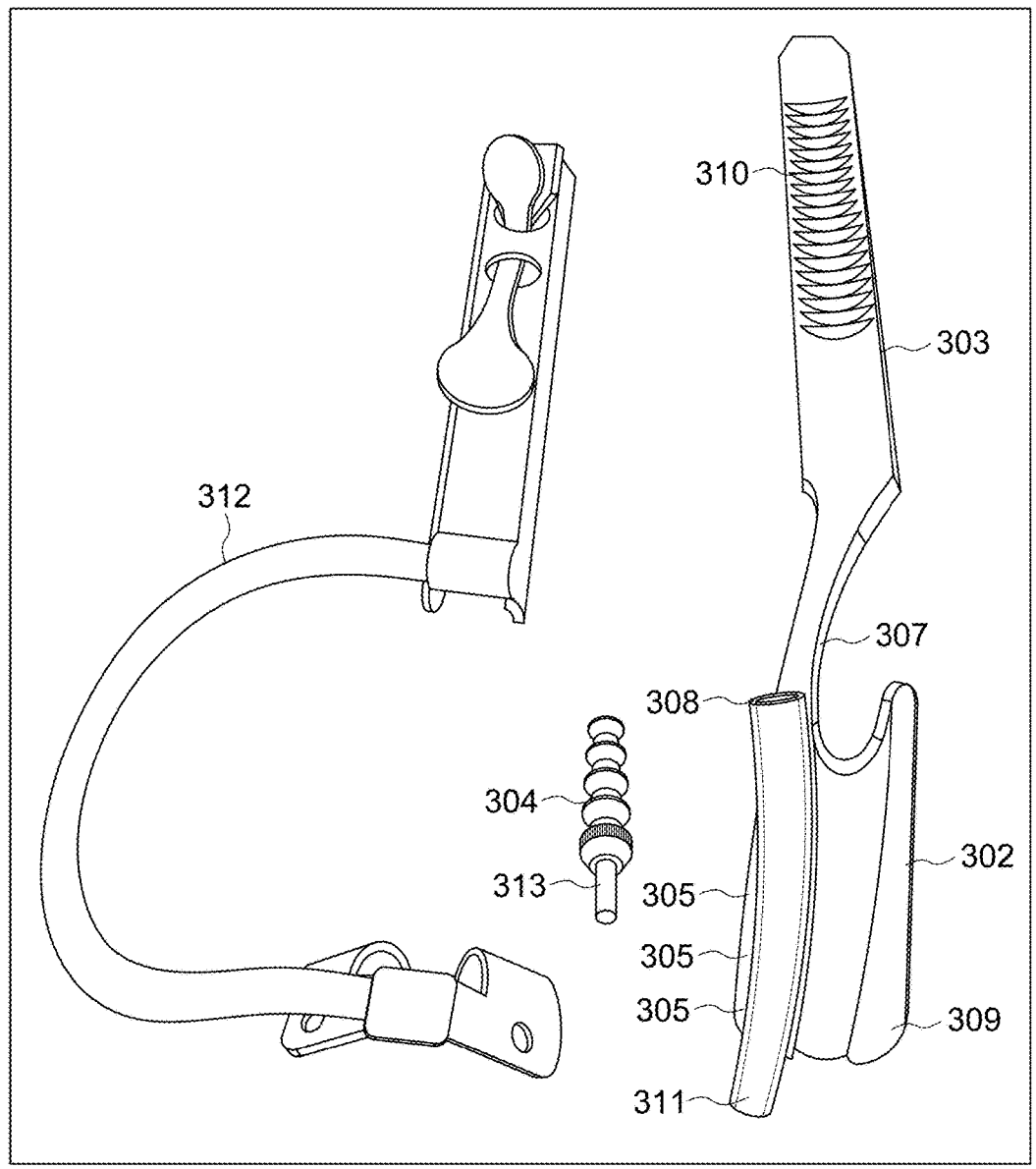
FIG. 3 shows an illustration of an embodiment of a two-piece tongue retractor with oral frame disassembled.
Figure 4A:
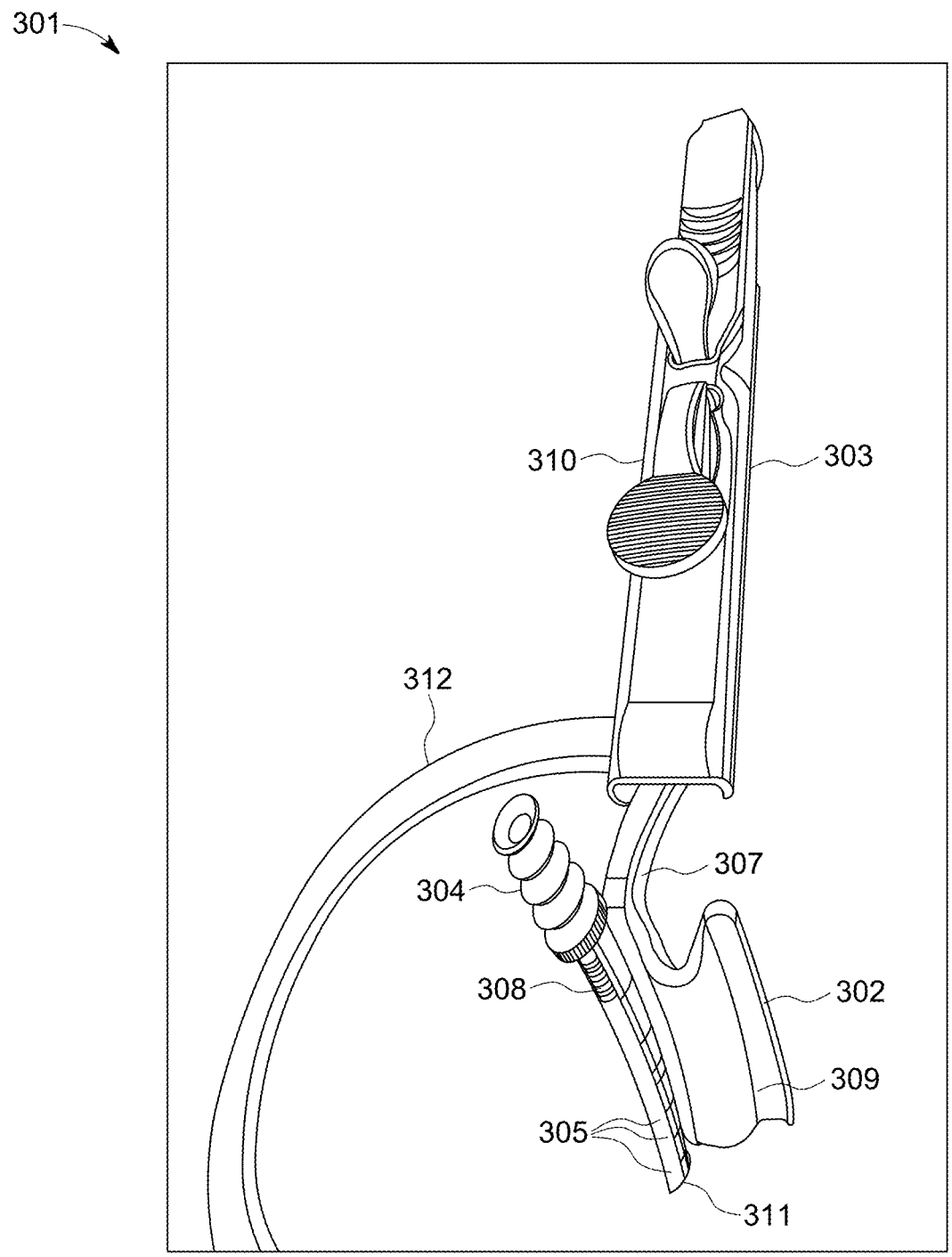
FIG. 4A shows a front perspective view of a two-piece tongue retractor with oral frame assembled.
Figure 4B:
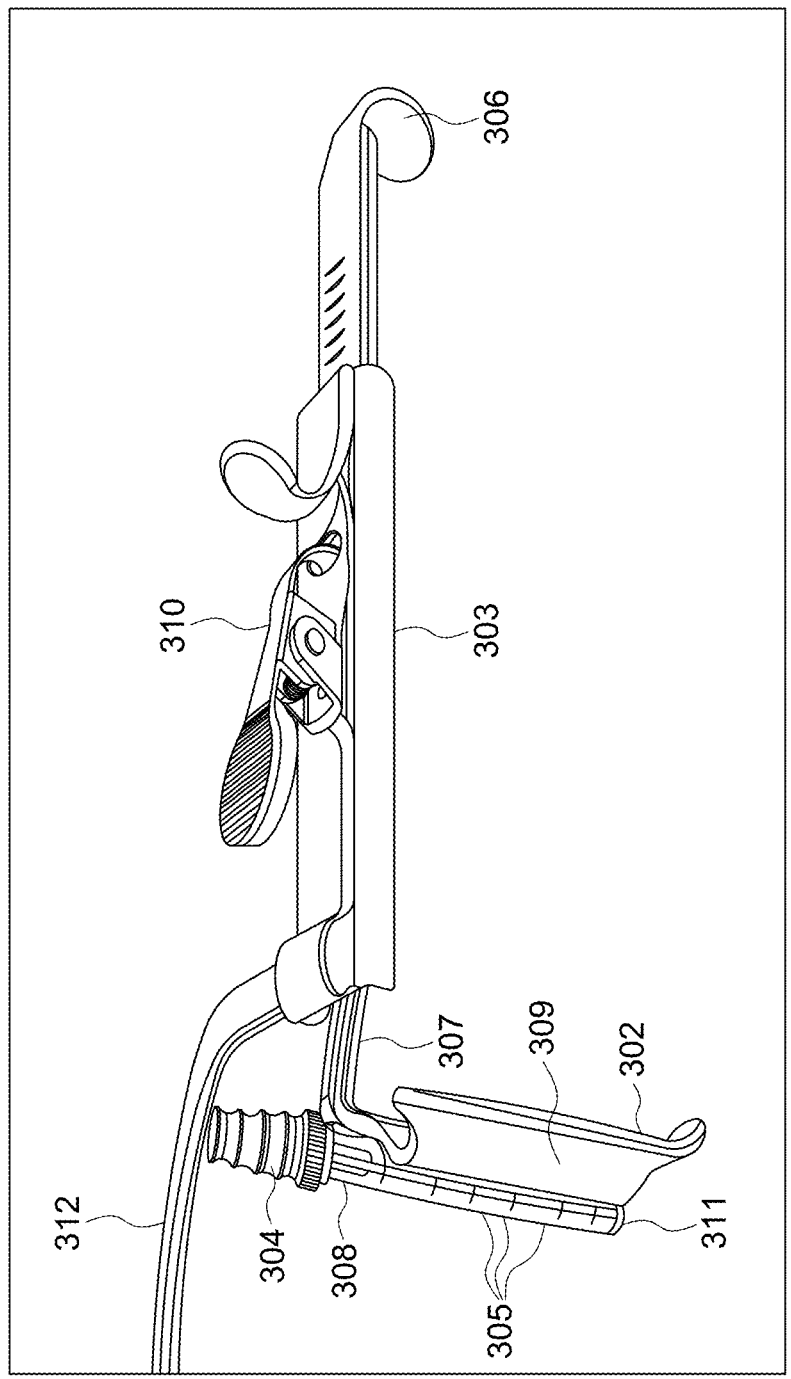
FIG. 4B shows a side perspective view of the assembled embodiment shown in FIG. 4A.

Shown in FIG. 3 and FIGS. 4A-B are illustrations of a two-piece embodiment 301 of the surgical device. FIG. 3 is an illustration of the embodiment disassembled, and FIGS. 4A-B are illustrations of an assembled device. This is a two-piece device, similar to the previous design by having a conduit 311 with a row of apertures 305 along the tongue blade 302. However, the receiving port 304 of the conduit 305 is removable. The receiving port 304 pneumatically connects to the conduit by inserting the distal end 313 of the receiving port into the proximal end 308 of the conduit. The receiving port 304 allows a surgeon to direct the suction vertically out of the oral cavity as shown in FIGS. 4A-B (rather than at a 90-degree angle along the handle 303 of the oral mouthpiece). It requires placement of the receiving port 304 after the tongue blade 302 and oral retractor 312 are assembled and in position. Surgeons may find this ideal depending on their surgical setup. The handle 303 and the tongue blade 302 are linked by a neck 307. The tongue blade 302 also has a channel 309 similar to 109 to accommodate placement and stabilization of airway equipment.

Figure 5C:
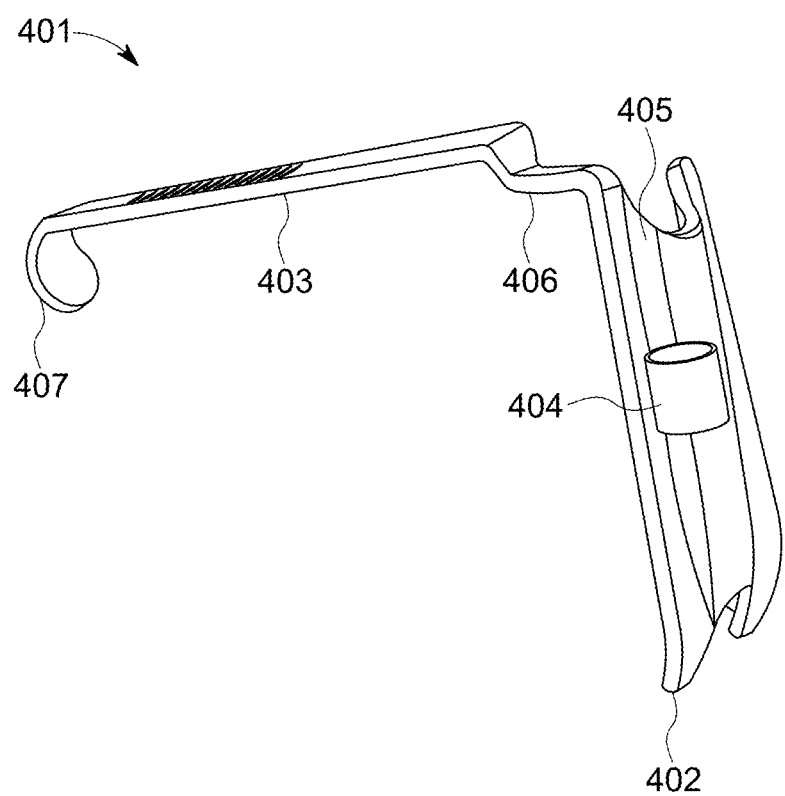
FIG. 5C shows a side perspective view of the embodiment shown in FIG. 5A.
Figure 6D:
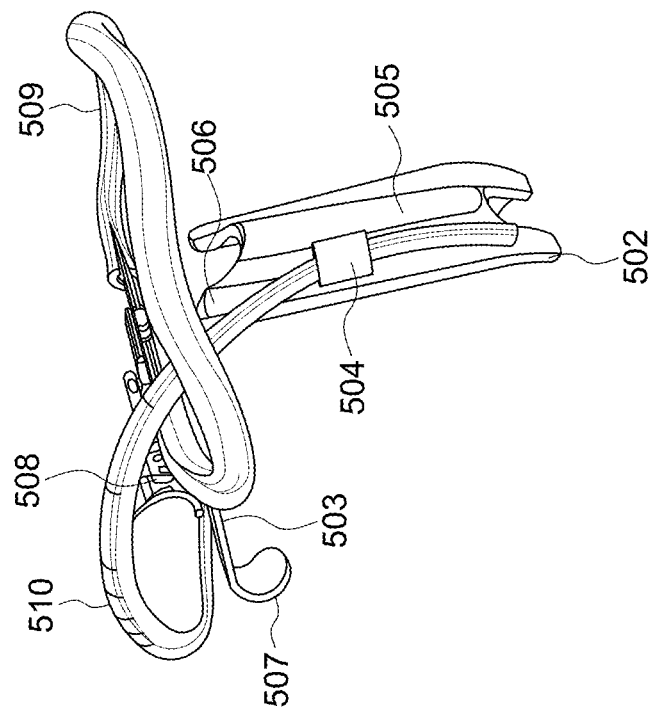
FIG. 6D shows side perspective view of an embodiment.
Figure 6C:
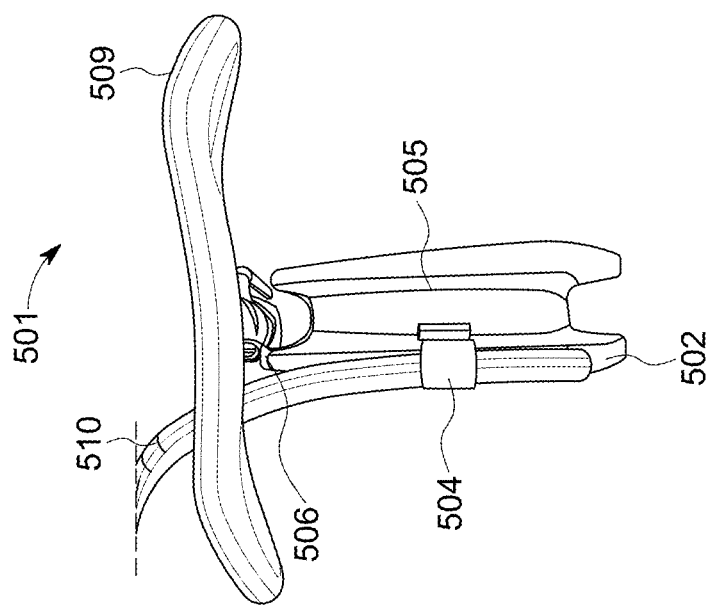
FIG. 6C shows a front perspective view of the embodiment shown in FIG. 6A with a suction tube inserted into a suction tube attachment.
Figure 6E:
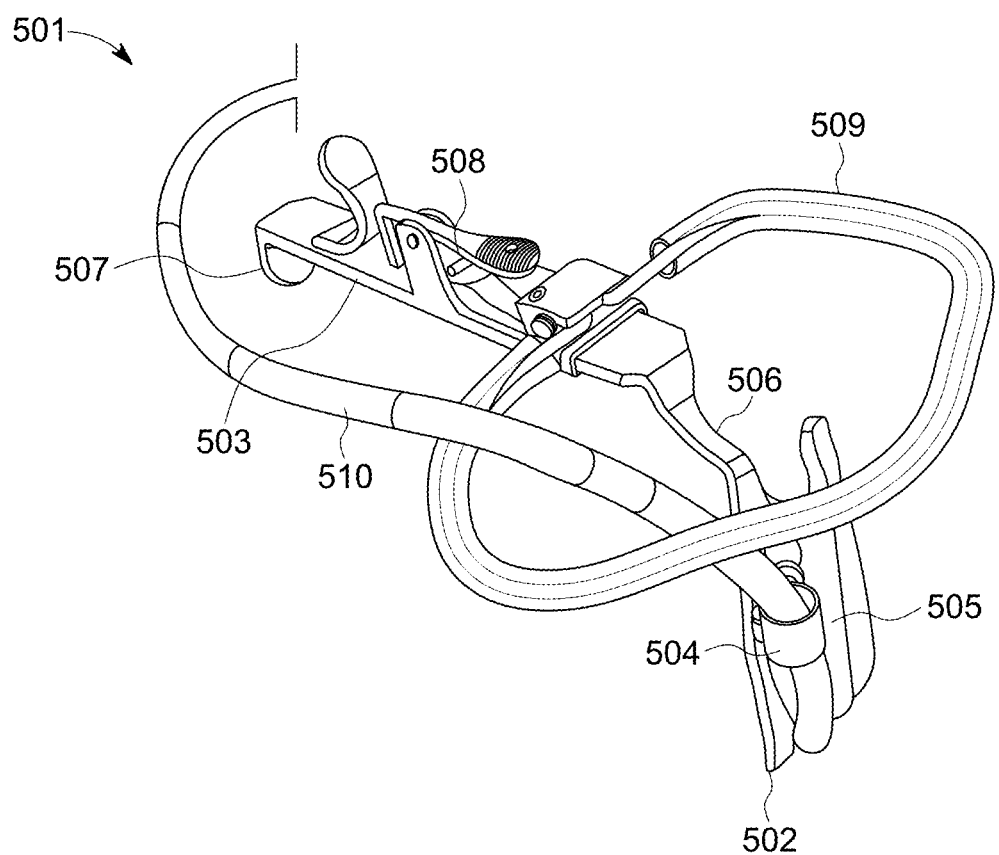
FIG. 6E shows a top perspective view of the embodiment shown in FIG. 6C.
Figure 7A:
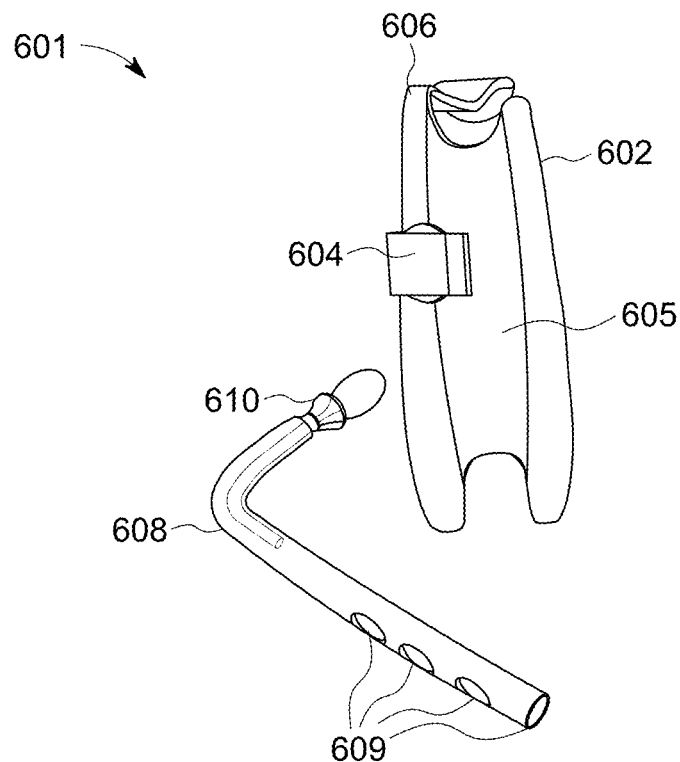
FIG. 7A shows an embodiment of a tongue retractor with an attachment component and a rigid fenestrated suction component.
Figure 7B:
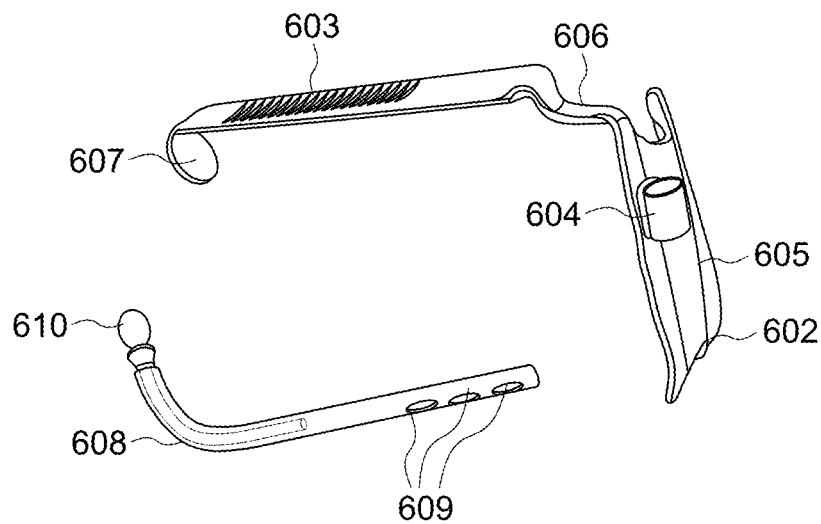
FIG. 7B shows the embodiment shown in FIG. 7A as viewed from a different angle.
Figure 7C:
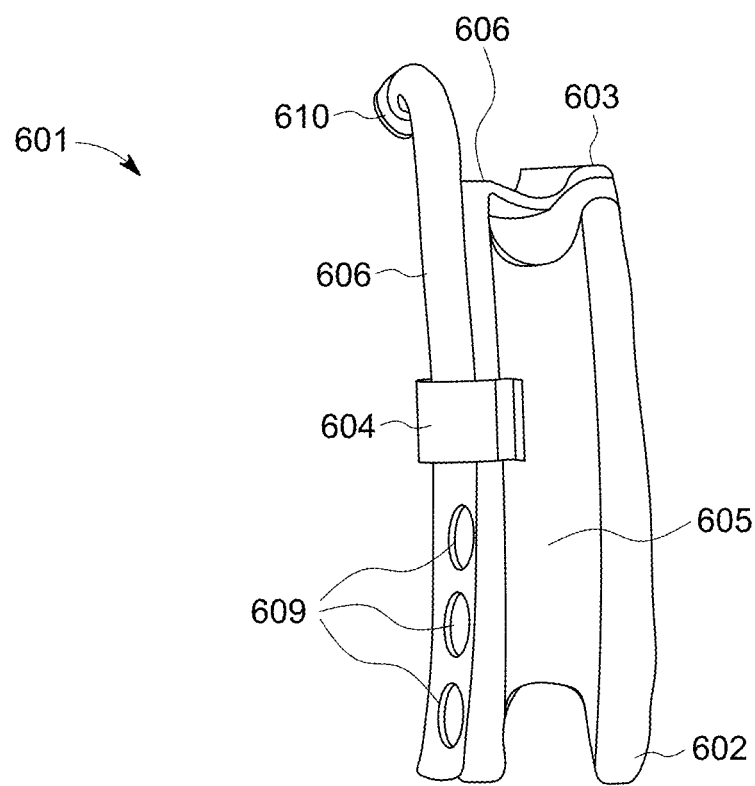
FIG. 7C shows a perspective of the embodiment of FIG. 7A with the rigid fenestrated suction component attached.
Figure 7D:
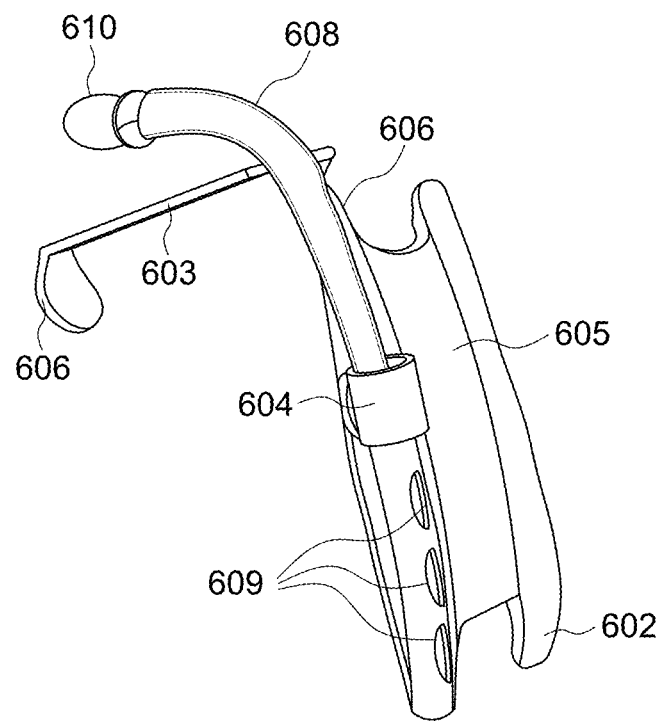
FIG. 7D shows the embodiment of FIG. 7C as viewed from a different angle.

In certain embodiments, this device consists of two components: tongue retractor with an attachment component located on the tongue blade, and a suction conduit with a row of apertures that fits inside the attachment component. FIGS. 5A-C provide illustrations of a tongue retractor 401 with a tongue blade 402 having an attachment component 404 for receiving a suction or pneumatic conduit. The tongue blade 402 further comprises a channel 405 (similar to 109) to place and stabilize airway equipment. The attachment component 404 (on the front face of the tongue blade 402 as shown) maybe located on either side of the channel 405 based on the users preference. The tongue retractor 401 further comprises a handle 403 attached to the tongue blade 402 with a curved end 407 for stabilizing the retractor 401 when placed in the oral cavity. The handle 403 and the tongue blade 402 are linked by a neck 406.

FIGS. 6A-E are illustrations of a tongue retractor 501 with a tongue blade 502 having a first attachment component 504 (on the front face of the tongue blade 502 as shown) for a suction or pneumatic conduit 510 and a handle 503 with a second attachment component 508 for an oral mouthpiece 509. The first attachment component 504 accommodates a pneumatic conduit 510 in a position that does not impede the placement of an oral mouthpiece 509. The pneumatic conduit 510 maybe flexible or rigid and has a row of apertures for evacuating material. The tongue blade 502 further comprises a channel 505 to place and stabilize airway equipment. The first attachment component 504 maybe located on either side of the channel 505 based on the users preference. The tongue retractor 501 further comprises a handle 503 attached to the tongue blade 502 with a curved end 507 for stabilizing the retractor 501 when placed in the oral cavity and a second attachment component 508 for an oral mouthpiece 509. The handle 503 and the tongue blade 502 are linked by a neck 506. The tongue blade 502 also has a channel 505 to accommodate placement and stabilization of airway equipment.

FIG. 7 show an example of a rigid pneumatic conduit 608 with a receiving port 610 and a row of apertures 609 for evacuating material from a surgical site. The pneumatic conduit 608 is placed in an attachment component 604 located on a tongue blade 602 (on the front face as shown). The receiving port 610 is connected to an external pneumatic evacuation device. This modification of the tongue blade involves at least one (or several) attachment components 604 along the blade designed to support the second component which is a reusable pneumatic conduit 608 with a row of apertures 609. The conduit 608 is inserted into the attachment component 604 after the tongue blade 602 is assembled and positioning in the oral cavity. The conduit slides into position along the tongue blade to evacuate material from the surgical field while not interfering with the surgeon's view. The surgeon may find this ideal given the precise fit of the suction and its reusable nature. The ability to remove it allows ease of cleaning. FIGS. 7A-B show the conduit 608 and retractor disassembled, and FIGS. 7C-D show the assembled device. The handle 603 and the tongue blade 602 are linked by a neck 606. The tongue blade 602 also has a channel 605 (similar to 109) to accommodate placement and stabilization of airway equipment.

Figure 8A:
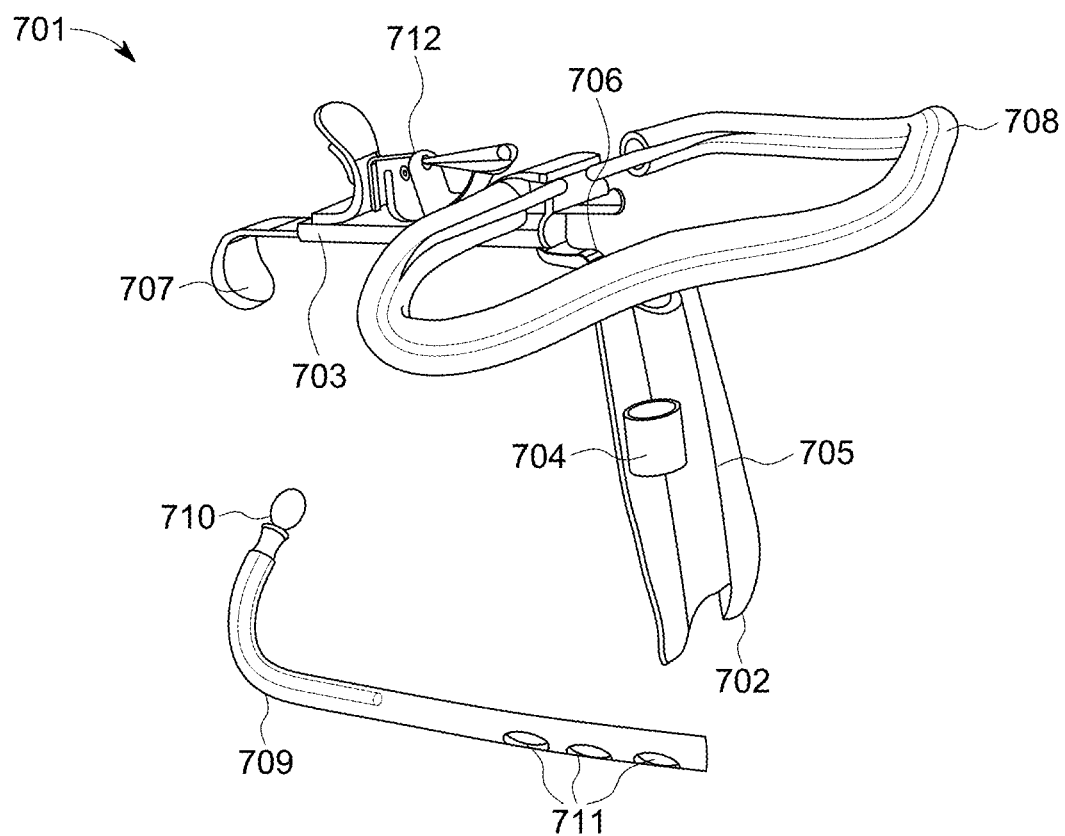
FIG. 8A shows an embodiment of a tongue retractor with an attachment, rigid fenestrated suction component and an oral mouthpiece.
Figure 8B:
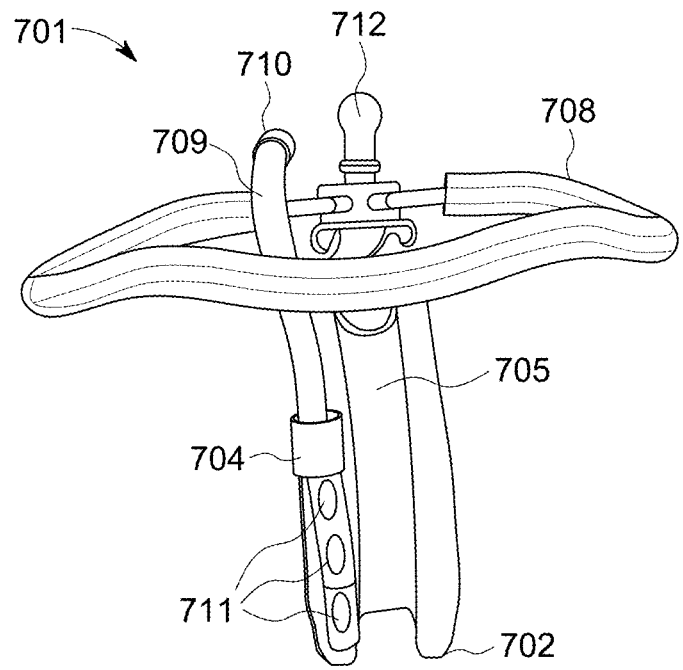
FIG. 8B shows the embodiment shown in FIG. 8A with the fenestrated suction component attached.
Figure 8C:
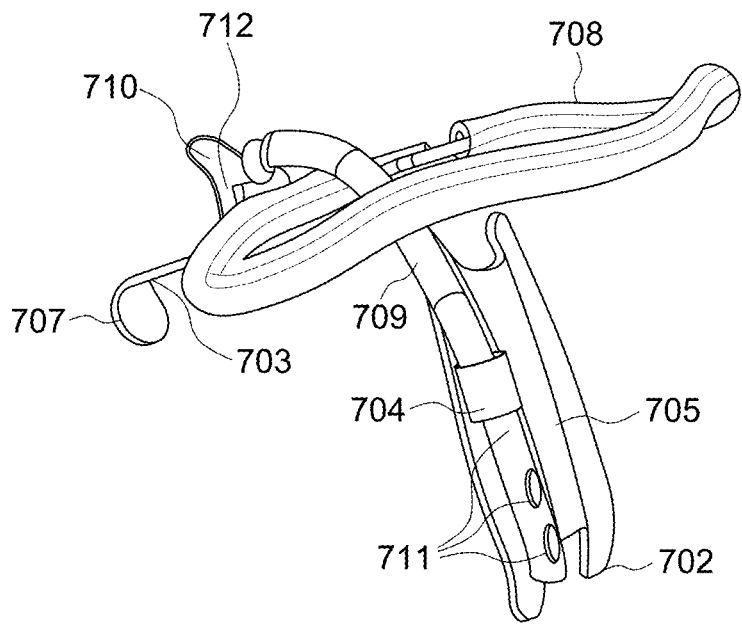
FIG. 8C shows the embodiment of FIG. 8A as viewed from a different angle.
Figure 9A:
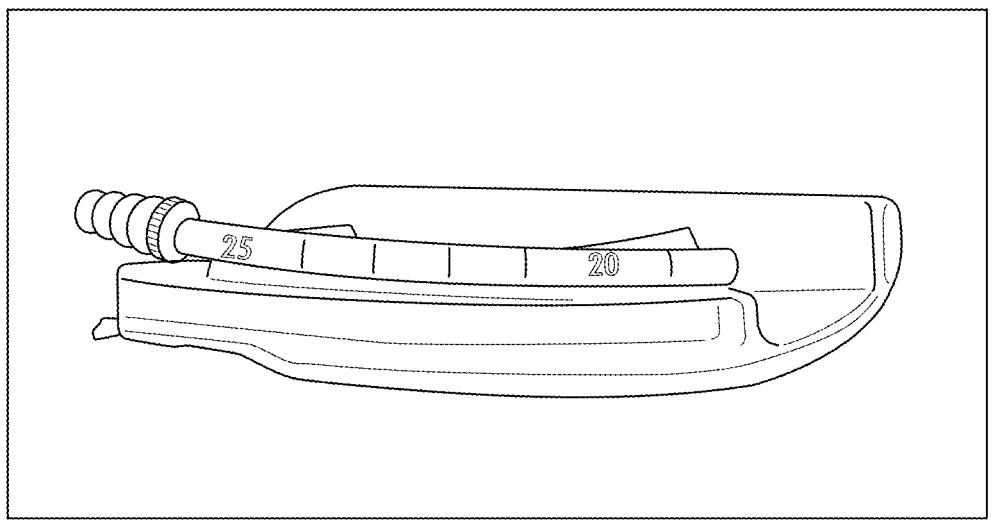
FIG. 9A shows a photographan embodiment of a fenestrated laryngeal blade.
Figure 9C:
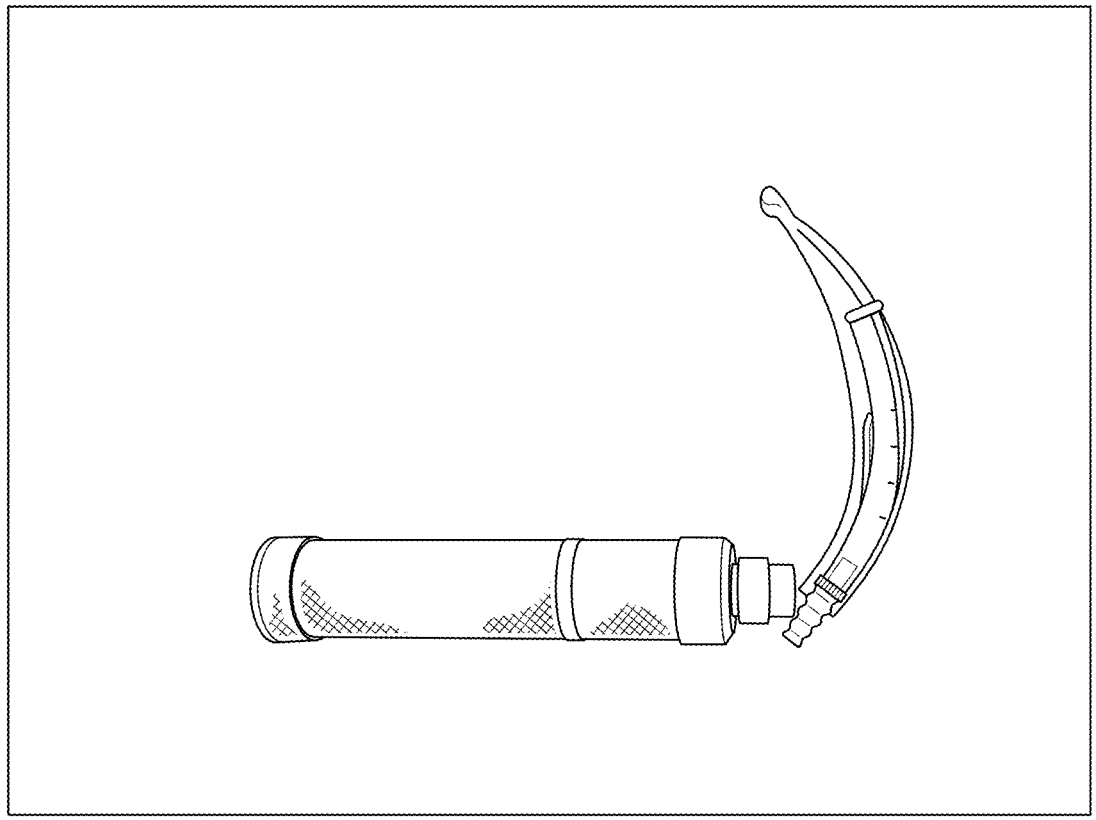
FIG. 9C shows a photograph of the fenestrated laryngeal blade with attached blade handle.
Figure 9B:
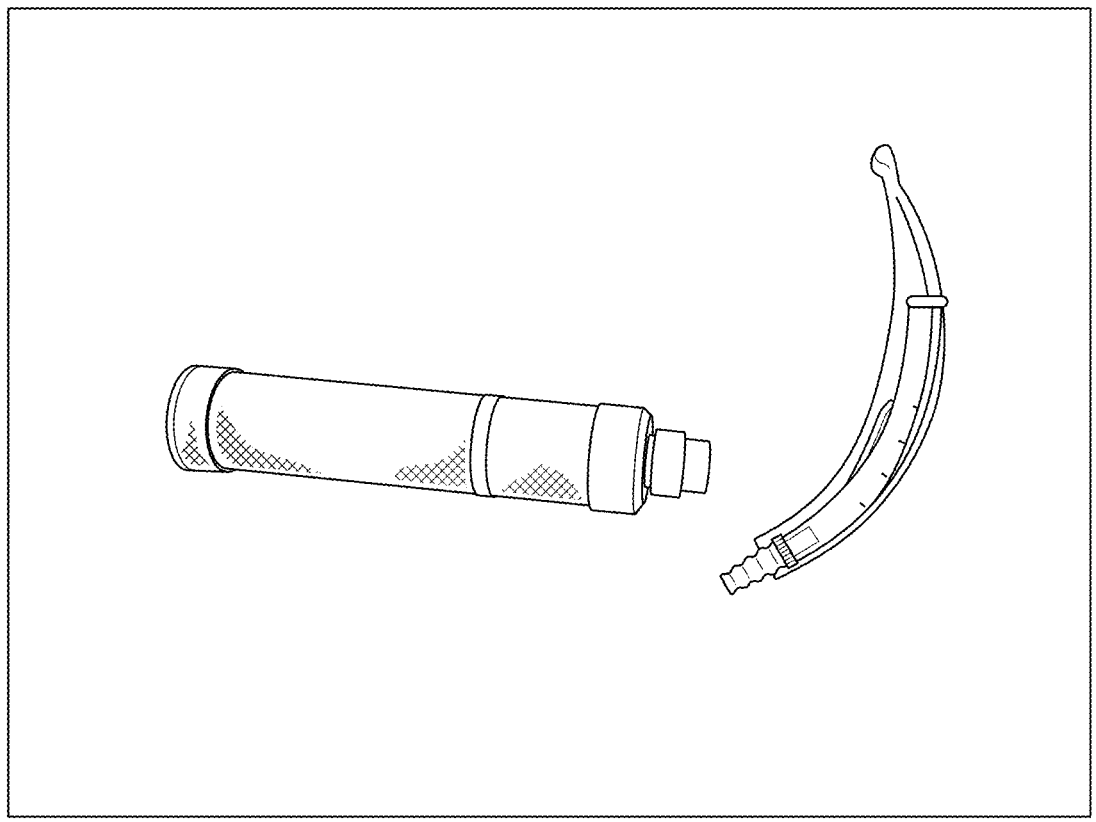
FIG. 9B shows a photograph of the fenestrated laryngeal blade with unattached blade handle.
Figure 10A:
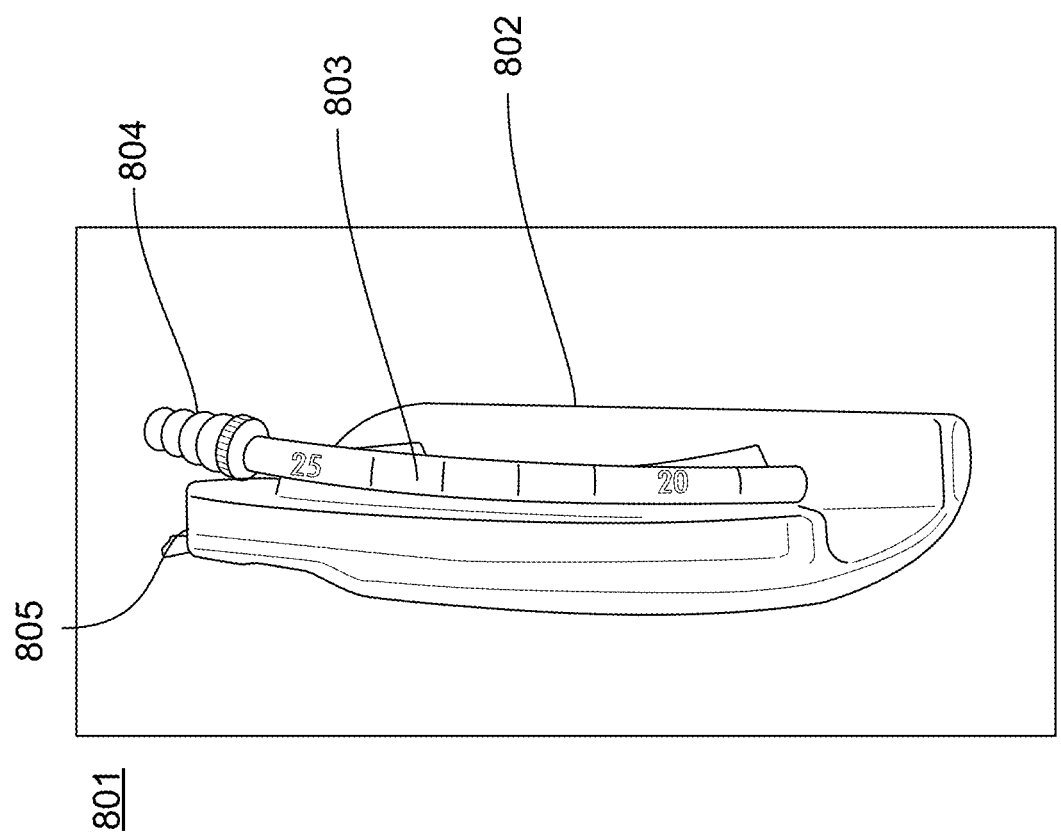
FIG. 10A provides a view of the photograph provided in FIG. 9A.
Figure 10C:
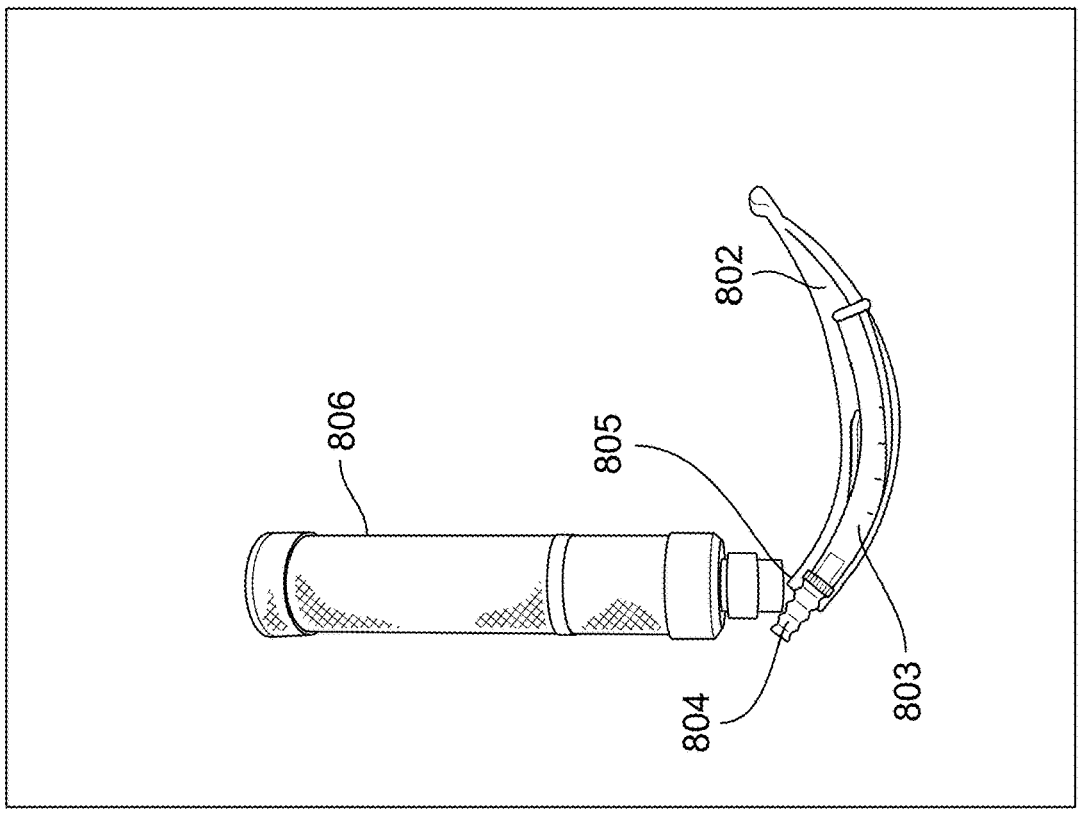
FIG. 10C shows a view of the photograph shown in FIG. 9C.
Figure 10B:
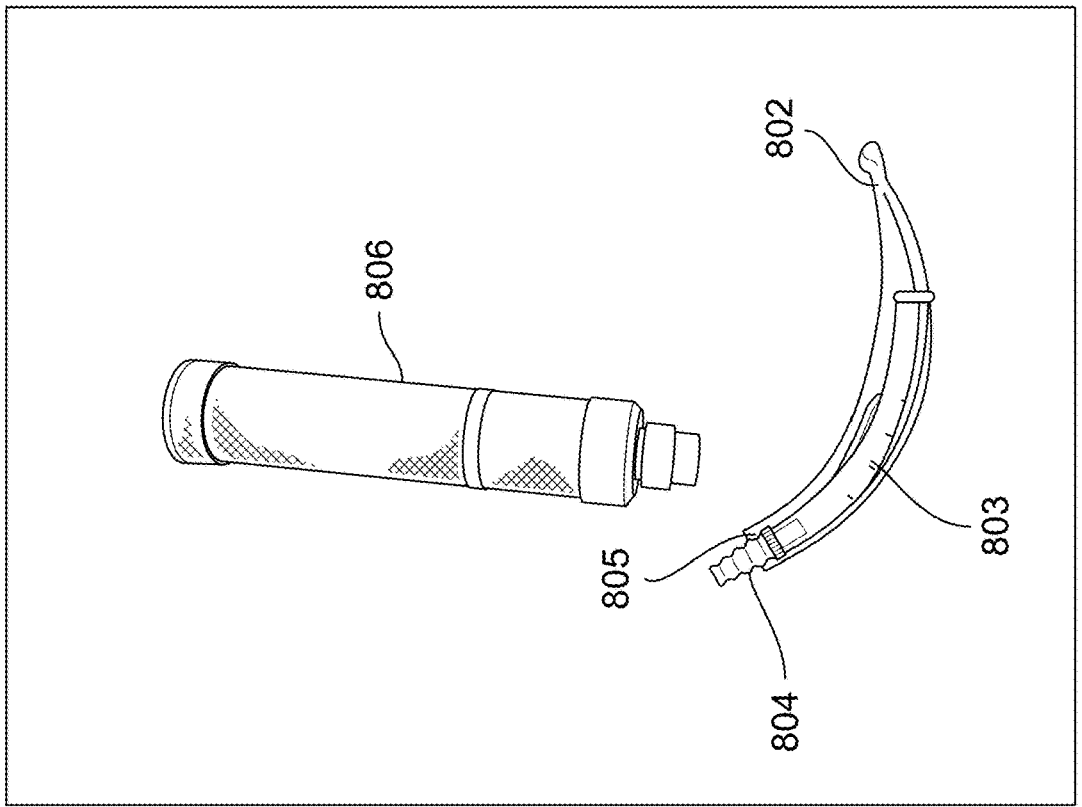
FIG. 10B shows a view of the photograph shown in FIG. 9B.

FIG. 8 is an illustration of a tongue retractor 701 with a tongue blade 702 having one or more first attachment components 704 for a rigid suction or pneumatic conduit 709 and a handle 703 with a second attachment component 712 for an oral mouthpiece 708. The first attachment component 704 accommodates a pneumatic conduit 709 in a position that does not impede the placement of an oral mouthpiece 708. The pneumatic conduit 709 has a receiving port 710 and a row of apertures 711 for evacuating material. The tongue blade 702 further comprises a channel 705 (similar to 109) to place and stabilize airway equipment. The first attachment component 704 maybe located on either side of the channel 705 based on the users preference. The tongue retractor 701 further comprises a handle 703 attached to the tongue blade 702 with a curved end 707 for stabilizing the retractor 701 when placed in the oral cavity and a second attachment component 712 for an oral mouthpiece 708. The handle 703 and the tongue blade 702 are linked by a neck 706.

As shown in FIGS. 9A-C and FIGS. 10A-C, shown 801 is a laryngeal tongue blade 802 comprising a pneumatic conduit 803 with a row of apertures. Device is a laryngeal blade 802 with a fenestrated conduit 803 manufactured to one side (left or right depending on provider's preference) and an attachment component 805 for connecting to a laryngeal handle 806. The conduit comprises a receiving port 804 that attaches to standard hospital suction (clinic, operating room or portable) and a row of apertures for evacuation of materials.

Construction material for these designs include, but is not limited to, reusable materials such as stainless steel or surgical aluminum to be sterilely processed and re-used or disposable materials such as plastics and polymers for single use.

While one or more embodiments of the present disclosure have been shown and described herein, such embodiments are provided by way of example only. For example, the conduit or attachment component may be positioned on the rear face of the tongue blade or the center of the tongue blade. Variations, changes and substitutions may be made without departing from the invention herein. Accordingly, it is intended that the invention be limited only by the spirit and scope of the appended claims. The teachings of all references cited herein are incorporated in their entirety to the extent not inconsistent with the teachings herein.

What is claimed is:

1. A surgical retractor for evacuation of a surgical site, and which is connectable to a pneumatic evacuation device, comprising:
    a tongue blade comprising a proximal end and a distal end,
    a conduit associated with the tongue blade, wherein the conduit extends along the tongue blade in a tongue blade proximal end to tongue blade distal end direction, and the conduit comprising a row of apertures;
    a receiving port that pneumatically communicates with said conduit; and
    a handle comprising a distal end, a proximal end, wherein the distal end of the handle is connected to the proximal end of the tongue blade;
    wherein the receiving port connects to the pneumatic evacuation device;
    wherein the row of apertures are pneumatically connected to the pneumatic evacuation device by the receiving port; and
    wherein the tongue blade defines a rearward concave space that serves as a channel for airway equipment.

2. The retractor of claim 1, wherein the conduit is integral to the tongue blade.

3. The retractor of claim 1, wherein the tongue blade has a length of about 60 mm to about 110 mm.

4. The retractor of claim 1, wherein the tongue blade has a width of about 20 mm to about 40 mm.

5. The retractor of claim 1, wherein the tongue blade is curved.

6. The retractor of claim 1, wherein the row of apertures comprises at least 2 apertures.

7. The retractor of claim 1, wherein the handle comprises a curved tip at the proximal end of the handle.

8. The retractor of claim 1, wherein the surgical retractor can evacuate liquid, aerosol, or airborne matter from a surgical site.

9. The retractor of claim 1, wherein the handle further comprises an attachment component for a surgical device.

10. The retractor of claim 9, wherein the surgical device comprises a second retractor or a mouthpiece.

11. The retractor of claim 1, wherein the receiving port is affixed to the conduit at an angle between about 90° and about 180°.

12. A surgical retractor for evacuation of a surgical site, and which is connectable to a pneumatic evacuation device, comprising:
    a tongue blade comprising a proximal end and a distal end,
    a conduit associated with the tongue blade, wherein the conduit extends along the tongue blade in a tongue blade proximal end to tongue blade distal end direction;
    a handle comprising a distal end, a proximal end, wherein the distal end of the handle is connected to the proximal end of the tongue blade; and
    a mouthpiece connected to the handle via a mouthpiece attachment component; and
    a receiving port that affixes to and pneumatically communicates with said conduit.

13. The surgical retractor of claim 12, wherein the conduit is a pneumatic tube comprising a row of apertures and a receiving port at the proximal end, wherein the tube is secured to the tongue blade by an attachment component on the tongue blade.

14. The retractor of claim 13, wherein the tube is comprised of a flexible or rigid material.

\* \* \* \* \*